United States Patent
Davis, Jr. et al.

[19]

[11] Patent Number: 6,126,228
[45] Date of Patent: Oct. 3, 2000

[54] WIRE HARNESS FOAMED TO TRIM PANEL

[75] Inventors: Joseph J. Davis, Jr., Ortonville; William L. Knight, Jr., Oxford; Gary Sadek, Plymouth, all of Mich.

[73] Assignee: Lear Automotive Dearborn, Inc., Southfield, Mich.

[21] Appl. No.: 08/927,748

[22] Filed: Sep. 11, 1997

[51] Int. Cl.⁷ ...................................................... B60J 5/04
[52] U.S. Cl. ...................... 296/146.7; 296/39.1; 296/214; 174/72 A
[58] Field of Search ................................ 296/152, 146.7, 296/39.1, 214; 174/116, 117 AS, 113 AS, 110 F, 72 A, 72 C

[56] References Cited

U.S. PATENT DOCUMENTS

| | | | |
|---|---|---|---|
| 3,630,564 | 12/1971 | Ferrara | 174/72 A X |
| 3,733,428 | 5/1973 | Fry | 174/72 A |
| 3,946,768 | 3/1976 | Fiorentino . | |
| 3,985,951 | 10/1976 | Harris . | |
| 4,210,773 | 7/1980 | Haley et al. | 174/72 A |
| 4,270,961 | 6/1981 | Faranetta et al. . | |
| 4,444,705 | 4/1984 | Kumasaka et al. . | |
| 4,653,155 | 3/1987 | Hara . | |
| 4,848,829 | 7/1989 | Kidd | 296/152 |
| 4,923,537 | 5/1990 | Matsushima . | |
| 4,976,490 | 12/1990 | Gentle | 296/183 |
| 4,997,689 | 3/1991 | Langen et al. . | |
| 5,030,116 | 7/1991 | Sakai et al. . | |
| 5,082,253 | 1/1992 | Suzuki et al. . | |
| 5,168,124 | 12/1992 | Takase et al. . | |
| 5,224,299 | 7/1993 | Abe | 296/39.1 X |
| 5,230,146 | 7/1993 | Tsuji et al. . | |
| 5,338,014 | 8/1994 | Kitamura . | |
| 5,484,186 | 1/1996 | Van Order et al. | 296/214 |
| 5,490,664 | 2/1996 | Justus et al. . | |
| 5,500,179 | 3/1996 | Onishi et al. . | |
| 5,535,511 | 7/1996 | Karasik . | |
| 5,573,298 | 11/1996 | Walker et al. | 296/146.6 X |
| 5,598,627 | 2/1997 | Saka et al. . | |

FOREIGN PATENT DOCUMENTS

| | | | |
|---|---|---|---|
| 0235924 | 1/1987 | European Pat. Off. . | |
| 3337596 A1 | 4/1985 | Germany | 174/72 A |
| 3337596 | 7/1985 | Germany . | |
| 3740593 | 6/1989 | Germany . | |
| 404169346 | 6/1992 | Japan | 296/146.7 |
| 405207628 | 8/1993 | Japan | 174/72 A |

*Primary Examiner*—Joseph D. Pape
*Attorney, Agent, or Firm*—Brooks & Kushman P.C.

[57] ABSTRACT

A plurality of wires are encased in a foam sheath which also secures the plurality of wires to a trim panel of a vehicle. The plurality of wires are first routed on a first surface of the trim panel. The plurality of wires are then at least partially enclosed by a mold having a trough, with the plurality of wires positioned between the mold and the trim panel. A generally liquid polymer is then introduced into the trough. When the polymer cures, it forms a protective sheath around the plurality of wires and secures the wires to the first surface of the trim panel.

17 Claims, 2 Drawing Sheets

WIRE HARNESS FOAMED TO TRIM PANEL

BACKGROUND OF THE INVENTION

The present invention relates generally to wire harnesses and more particularly to a method and means for securing a wire harness to an interior trim panel of a vehicle.

Current vehicles include many wire harnesses secured to interior trim panels, such as door panels and headliners, for operating interior lights, such as a dome light or lights in a vanity mirror in a visor. Further, interior door trim panels include wire harnesses routed to user activated switches, such as for power windows, power locks, mirrors, etc.

Each wire harness comprises a plurality of wires which are bundled to form a trunk in a plurality of branches extending from the trunk. Typically, each of the branches includes an electrical connector at an outer end. During assembly of the wire harness, the wire bundles ar are held together in an assembly jig, which includes a plurality of wire supports supporting the wires along each of the main trunk and each of the branches. Each wire is placed onto the assembly jig onto the appropriate wire supports, i.e. from a first branch to the wire harness, along the main trunk and through a second branch, typically at an opposite end of the wire harness. Electrical connectors are then connected to the outer ends of the wires at the branches. The wires are then wrapped with tape along the entire length of the main trunk and each of the branches.

A wire harness is placed on an interior trim panel prior to installation of the trim panel into the vehicle. The main trunk and each of the branches are positioned in appropriate locations on the trim panel. Then, the wire harness is secured to the trim panel with an adhesive, such as a hot glue, which secures the main trunk and branches of the wire harness to the trim panel. This method is time consuming and the adhesive is expensive. Further, it is difficult to secure the wire harness to the trim panel consistently and reliably. Further, manufacture of the wire harness as described above is time consuming and difficult. Wrapping the tape along the entire length of the main trunk and each of the branches is a labor intensive process.

SUMMARY OF THE INVENTION

The present invention provides a wire harness which is foamed to an interior trim panel in a vehicle.

The present invention comprises an interior vehicle trim panel, such as a door panel or headliner, for mounting in an interior of a vehicle. A plurality of wires are disposed adjacent a first surface of the trim panel. A polymer foam sheath encases the wires and secures the wires to the first surface of the trim panel. The trim panel is preferably secured to an outer panel, with the first surface of the trim panel adjacent the outer panel. The plurality of wires and the foam are at least partially disposed within a channel formed in the outer panel.

In a method according to the present invention, the plurality of wires are first routed on the first surface of the trim panel. The plurality of wires are then at least partially enclosed by a mold having a trough, with the plurality of wires positioned within the trough between the mold and the trim panel. A polymer is then introduced into the trough, generally in a liquid form, flowing along the trough around an among the plurality of wires. When the polymer cures, it forms a sheath securing the wires to the first surface of the trim panel. The trim panel is then mounted to the outer panel, with the plurality of wires and sheath disposed within the channel of the outer panel.

The foam sheath provides an inexpensive and simple attachment of the wires to the trim panel. Further, the sheath can be utilized in place of, or in addition to, the wrapped tape sheath used on known wire harnesses.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
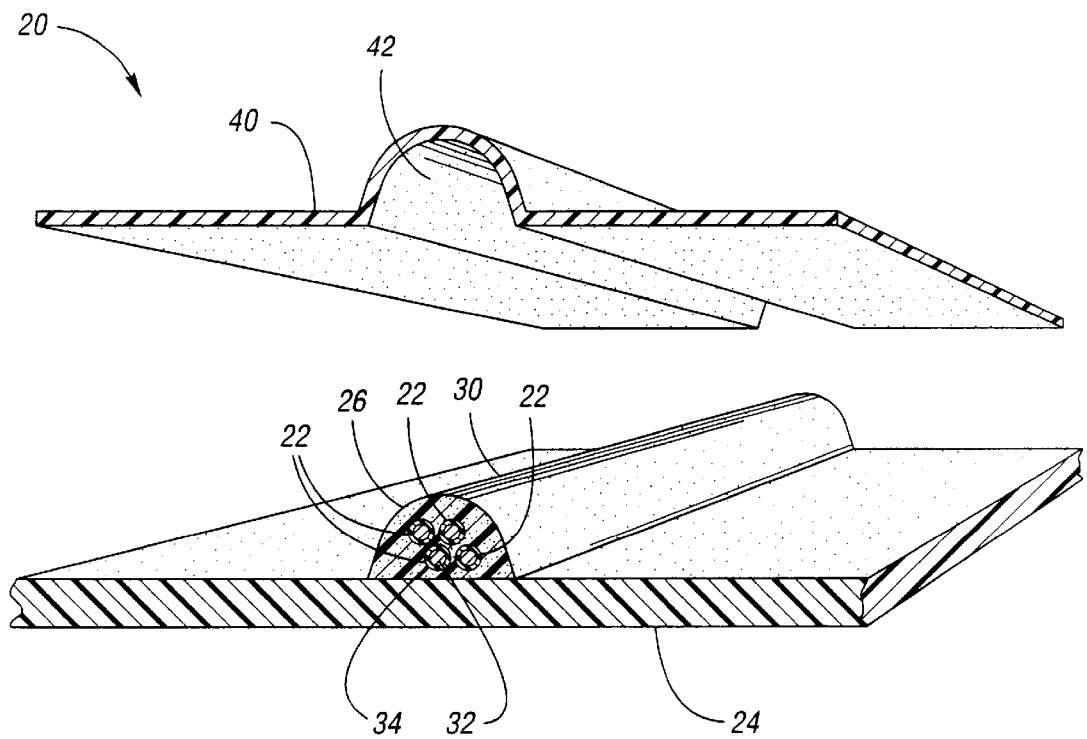
FIG. 1 is a perspective view, partially broken away, of the wire harness and trim panel of the present invention.

Referring to FIG. 1, an interior component 20 generally comprises a plurality of wires 22 secured to an interior trim panel 24 such as a headliner, interior door panel, etc. The trim panel 24 is preferably a molded polyurethane or polyester panel. The wires 22 are encased by a molded foam sheath 26, preferably Elastoflex® polymer foam, available from BASF.

The wires 22 and sheath 26, together comprise a wire harness 30, which is secured to an outer surface 25 of the trim panel 24 by the sheath 26. As can be seen in FIG. 1, each of the wires 22 comprises a conductor 32 encased by an insulator 34. The sheath 26 is disposed around and among the plurality of wires 22.

The trim panel 24, when installed into a vehicle (not shown), is secured to an outer panel 40 by an adhesive, fasteners, or other known means. The outer panel 40 includes a channel 42 which accommodates the wire harness 30 which protrudes from the outer surface 25 of the trim panel 24.

Figure 2:
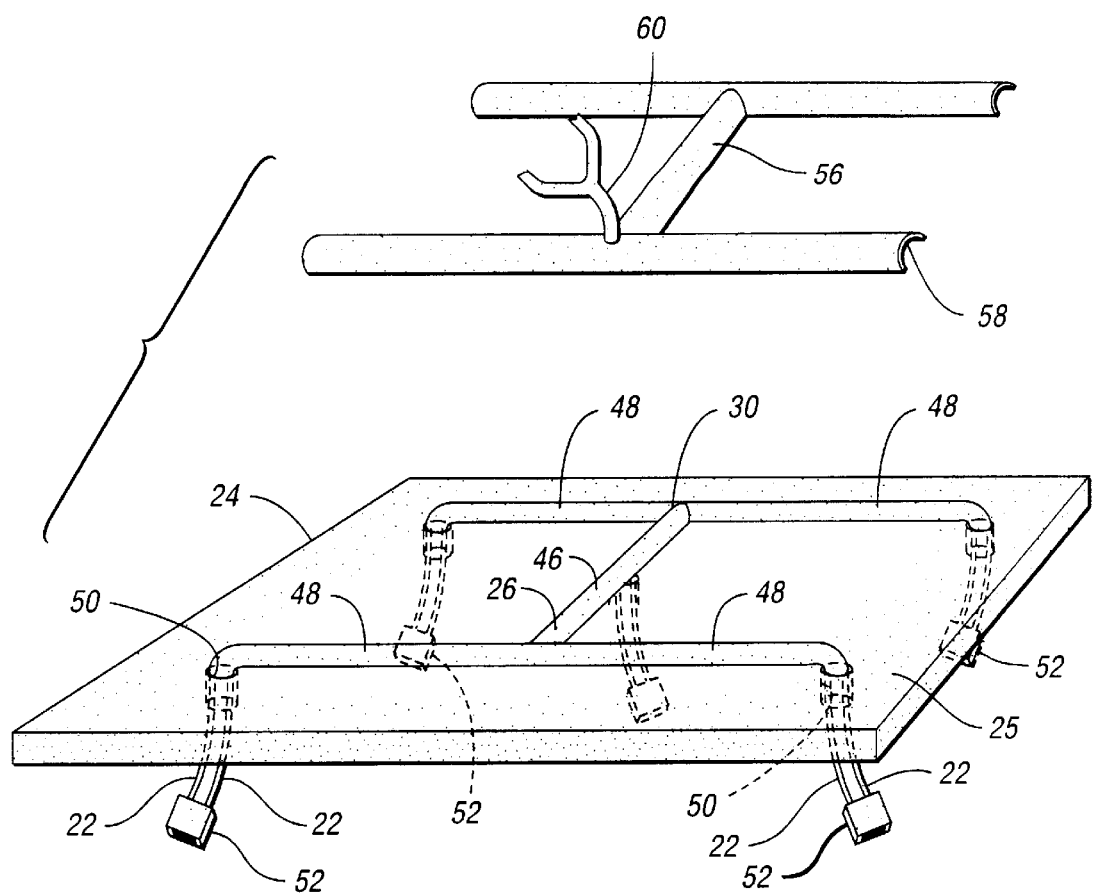
FIG. 2 illustrates the wire harness and trim panel of FIG. 1 and a mold for forming the wire harness on the trim panel.

As can be seen in FIG. 2, the wire harness 30 generally comprises a main trunk 46 continuous with a plurality of branches 48 which each extend through apertures 50 in the trim panel 24 and terminate in electrical connectors 52. Preferably, the plurality of wires 22 are spot taped or bundled into the main trunk 46 and branches 48 and connected to the electrical connectors 52. Then the wires 22 are placed onto the surface 25 of the trim panel 24. A mold 56 generally comprising a half cylinder forming a trough 58 is complementary to the main trunk 46 and branches 48 of the wire harness 30. The mold 56 further includes a polymer supply port 60 for supplying the foam to form sheath 26.

Figure 3:
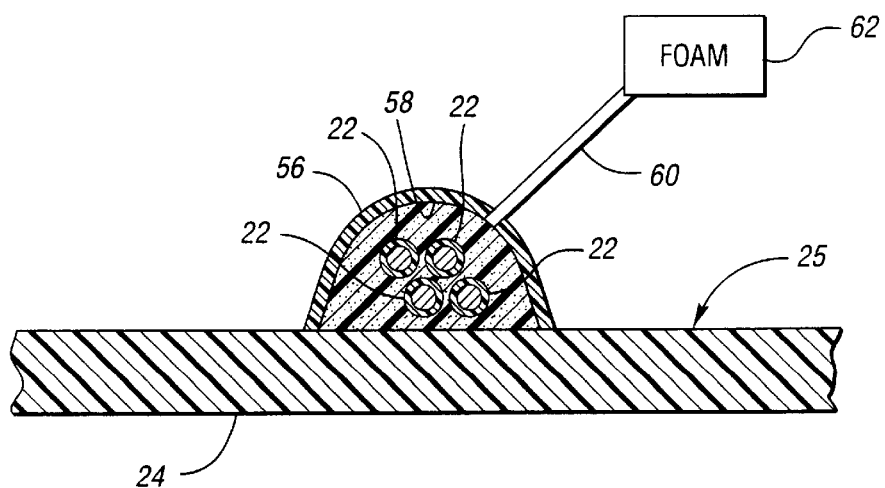
FIG. 3 is a sectional view, partially broken away, showing the wire harness being formed on the trim panel by the mold of FIG. 2.

As can be seen in FIG. 3, the wires 22 are first routed on the outer surface 25 of the trim panel 24. The mold 56 is then placed upon the outer surface 25 of the trim panel 24, at least partially, and preferably completely enclosing the wires 22 within the trough 58 between the mold 56 and the outer surface 25 of the trim panel 24. The foam 62 or other polymer is then introduced into the trough 58 through the polymer supply port 60. The foam 62 encases the wires 22 and adheres to the trim panel 24. The foam 62 is molded by the mold 66 to form the sheath 26.

The wire harness 30 and trim panel 24 of the present invention provide a durable, inexpensive attachment of wires 22 to the trim panel 24. Further, the sheath 26 encases and protects the wires 22. This process is less expensive and less time consuming then the previously utilized methods.

Figure 4:
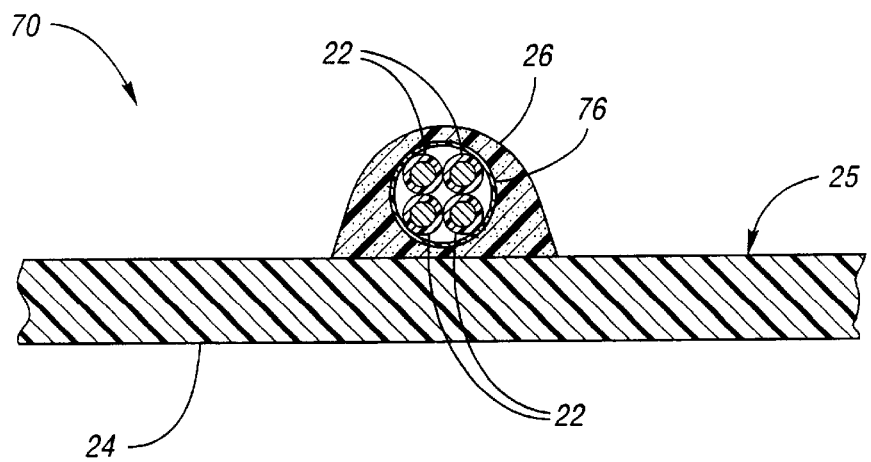
FIG. 4 illustrates a sectional view through an alternative wire harness and trim panel of the present invention.

An alternate interior component 70 is shown in FIG. 4. The wires 22 are first bundled and wrapped with tape 72 or some other sheath as in a known wire harness encased in the sheath 26 which secures the wires 22 to the outer surface 25 of the trim panel 24, in the same way described with respect to FIGS. 1–3.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. In combination:

a trim panel having a first surface;

a plurality of wires disposed adjacent said first surface of said trim panel;

a polymer encasing said wires and being molded to said first surface of said trim panel so as to secure said wires to said first surface; and an electrical connector electrically connected to at least two of said plurality of wires.

2. The combination according to claim 1 wherein said polymer is disposed among said plurality of wires.

3. The combination according to claim 1 wherein said polymer is molded around said plurality of wires.

4. The combination according to claim 1 further including an outer panel adjacent said first surface of said trim panel, said plurality of wires and said polymer at least partially disposed within a channel formed in said outer panel.

5. The combination according to claim 1 wherein said polymer is a foam.

6. The combination according to claim 1 wherein said at least two wires extend through said trim panel from said first surface to an opposite second surface, said electrical connector being disposed proximate said second surface of said trim panel.

7. A vehicle trim panel and wire harness combination comprising:

a vehicle trim panel for mounting in an interior of a vehicle, said trim panel having a first surface;

a plurality of wires disposed adjacent said first surface of said trim panel;

a foam sheath encasing said wires and securing said wires to said first surface of said trim panel; and an electrical connector electrically connected to at least two of said plurality of wires.

8. The combination according to claim 7 wherein said foam is disposed among said plurality of wires.

9. The combination according to claim 7 wherein said foam is molded to said first surface.

10. The combination according to claim 7 wherein said foam is molded around and among said plurality of wires.

11. The combination according to claim 7 further including an outer panel adjacent said first surface of said trim panel, said plurality of wires and said foam at least partially disposed within a channel formed in said outer panel.

12. The combination according to claim 7 wherein said at least two wires extend through said trim panel from said first surface to an opposite second surface, said electrical connector being disposed proximate said second surface of said trim panel.

13. In combination:

a trim panel having a first surface;

a plurality of electric wires disposed adjacent said first surface of said trim panel;

a sheath encasing said wires and securing said wires to said first surface of said trim panel; and an outer panel adjacent said first surface of said trim panel, said plurality of wires and said sheath being at least partially disposed within a channel formed in said outer panel.

14. The combination according to claim 13 wherein said sheath comprises a polymer.

15. The combination according to claim 13 wherein said sheath comprises a foam.

16. The combination according to claim 13 wherein said sheath is molded to said first surface.

17. The combination according to claim 13 wherein said sheath is molded around and among said plurality of wires.

* * * * *